US009471627B2

United States Patent
Boyle et al.

(10) Patent No.: US 9,471,627 B2
(45) Date of Patent: *Oct. 18, 2016

(54) PARTIAL MATCH DERIVATION USING TEXT ANALYSIS

(71) Applicant: INTERNATIONAL BUSINESS MACHINES CORPORATION, Armonk, NY (US)

(72) Inventors: Peter C. Boyle, Burnaby (CA); Stephen J. Edwards, Ward, CO (US); Victor Povar, Port Moody (CA); Eniko I. Rozsa, Coquitlam (CA); Ibrahim Mohamed Salah El Din Ahmed, Cairo (EG); Ahmed Samir Serour Mousa El-Gamal, Giza (EG); Craig M. Trim, Sylmar, CA (US); Claire R. Turner, Port Moody (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,666

(22) Filed: Jan. 2, 2016

(65) Prior Publication Data

US 2016/0117361 A1     Apr. 28, 2016

Related U.S. Application Data

(63) Continuation of application No. 13/892,047, filed on May 10, 2013, now Pat. No. 9,268,823.

(51) Int. Cl.
*G06F 17/30* (2006.01)

(52) U.S. Cl.
CPC ..... *G06F 17/30401* (2013.01); *G06F 17/3043* (2013.01); *G06F 17/30542* (2013.01)

(58) Field of Classification Search
CPC .............. G06F 17/3043; G06F 17/30542; G06F 17/3401
See application file for complete search history.

(56) References Cited

U.S. PATENT DOCUMENTS

| 5,454,106 A | 9/1995 | Burns et al. |
| 5,761,631 A | 6/1998 | Nasukawa |
| 7,319,952 B2 | 1/2008 | Weise |
| 7,403,938 B2 | 7/2008 | Harrison et al. |
| 7,409,337 B1 | 8/2008 | Potter et al. |
| 7,584,098 B2 * | 9/2009 | Yu ........................ G10L 15/04 704/231 |
| 7,720,674 B2 | 5/2010 | Kaiser et al. |
| 7,739,104 B2 | 6/2010 | Berkan et al. |
| 8,275,803 B2 | 9/2012 | Brown et al. |
| 8,332,394 B2 | 12/2012 | Fan et al. |
| 8,346,795 B2 | 1/2013 | Roulland et al. |
| 8,407,239 B2 | 3/2013 | Dean et al. |

(Continued)

*Primary Examiner* — Shiow-jy Fan
(74) *Attorney, Agent, or Firm* — Weitzman Law Offices, LLC (57) ABSTRACT

A natural language processing system and method resolves partial matches when a natural language input query does not fully specify an entity. The input query is tokenized into a set of query tokens, which are compared to contents of a searchable index, the contents representing entities, each of which is tokenized into a set of entity tokens associated with the tokenized entity. A plurality of partial match query tokens are identified from the set of query tokens, each partial match query token matching at least one entity token in the index. The entity(s) corresponding to each partial match query token are selected if a sequential break exists in the input query between the partial match query tokens and there is no intersection between the entity(s) corresponding to each partial match query token.

20 Claims, 8 Drawing Sheets

(56) References Cited

U.S. PATENT DOCUMENTS

| | | | |
|---|---|---|---|
| 8,533,203 B2* | 9/2013 | Chaudhuri | G06F 17/278 707/728 |
| 2003/0069880 A1 | 4/2003 | Harrison et al. | |
| 2005/0289124 A1 | 12/2005 | Kaiser et al. | |
| 2006/0161575 A1* | 7/2006 | Fan | G06F 17/30935 |
| 2007/0282822 A1 | 12/2007 | Anderson et al. | |
| 2008/0028010 A1 | 1/2008 | Ramsey | |
| 2008/0104037 A1 | 5/2008 | Bierner | |
| 2009/0119095 A1 | 5/2009 | Beggelman et al. | |
| 2009/0319500 A1* | 12/2009 | Agrawal | G06F 17/30011 |
| 2010/0125563 A1 | 5/2010 | Nair et al. | |
| 2012/0059713 A1 | 3/2012 | Galas et al. | |
| 2012/0245925 A1 | 9/2012 | Guha et al. | |
| 2012/0253783 A1 | 10/2012 | Castelli et al. | |
| 2012/0303356 A1 | 11/2012 | Boyle et al. | |

* cited by examiner

PARTIAL MATCH DERIVATION USING TEXT ANALYSIS

BACKGROUND

1. Field

This disclosure relates generally to data processing of linguistic data, and, more particularly, to a natural language processing system and method for resolving partial matches.

2. Background

A natural language processing (NLP) system is a computer-implemented software system that intelligently derives meaning and context from a natural language input, such as an input string of natural language text. A NLP system assists the computer in distinguishing how words are used in different contexts and in applying rules to construct syntactical and meaning representations. A NLP system has many different applications where a computer derives meaning and information from a natural language query or command, including (but not limited to) formulating database searches, speech and handwriting recognition, grammar and spell checking, and language translation.

A challenge in existing NLP systems is the ability to match products or entities that are not fully specified in a natural language input or query. For example, in a NLP system that parses user input or queries to find entities (e.g., products) in a list (e.g., catalog), the list may include the following entities:

1. Optima™ AgfaPhoto™ 102
2. Canon™ EOS™ 5D mark iii
3. EOS™ Rebel™ t3i
4. EOS™ Canon™ 1Ds Mark iii In this example, a user might submit a natural language query that contains a partial set of tokens, such as one of the following illustrative queries:

1. "What 5d mark iii model camera from Canon sold the best?"
2. "What agfa and powershot cameras from canon sold the best?"

In parsing a natural language input or query that includes a partial set of tokens, like the example queries above, existing NLP systems may resolve the query to multiple product matches or entities, when the query may in fact be directed to a single product or entity (as in the first query above).

BRIEF SUMMARY

In one aspect of this disclosure, a computer implemented natural language processing system and method are disclosed for resolving partial matches. A natural language input query is received that does not fully specify an entity. The input query is tokenized into a constituent set of query tokens. An entity index is searched by comparing the query tokens to contents of the index, the contents representing a plurality of entities, each of which is tokenized into a constituent set of entity tokens associated with the tokenized entity. A plurality of partial match query tokens are identified from the set of query tokens, each partial match query token matching at least one entity token in the index. A determination is made whether a sequential break exists in the input query between the partial match query tokens. For each partial match query token, the entity corresponding to each partial match query token are determined by identifying the entity associated with each entity token in the index that matches the partial match query token. A determination is made whether there is an intersection between the identified entities corresponding to the partial match query tokens. When a sequential break exists in the input query between the partial match query tokens and there is no intersection between the identified entities corresponding to the partial match query tokens, a determination is made that the input query relates to a plurality of entities, and a response is presented to a user based upon the identified entities.

In another aspect of this disclosure, a computer implemented natural language processing system and method are disclosed for resolving partial matches when a natural language input query does not fully specify an entity. The input query is tokenized into a constituent set of query tokens. The query tokens are compared to contents of a searchable index, the contents representing a plurality of entities, each of which is tokenized into a constituent set of entity tokens associated with the tokenized entity. A plurality of partial match query tokens are identified from the set of query tokens, each partial match query token matching at least one entity token in the index. A determination is made whether there is a sequential break in the input query between the partial match query tokens. For each partial match query token, the entity associated with each entity token in the index that matches the partial match query token is identified. A determination is made whether there is an intersection between the identified entities corresponding to the partial match query tokens. When a sequential break exists in the input query between the partial match query tokens and there is no intersection between the identified entities corresponding to the partial match query tokens, a determination is made that the input query relates to a plurality of entities, and a response is presented to a user based upon the identified entities.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This application discloses a computer-implemented natural language processing (NLP) system and method for resolving partial matches between entities stored in memory and a tokenized user input or query.

Figure 1:
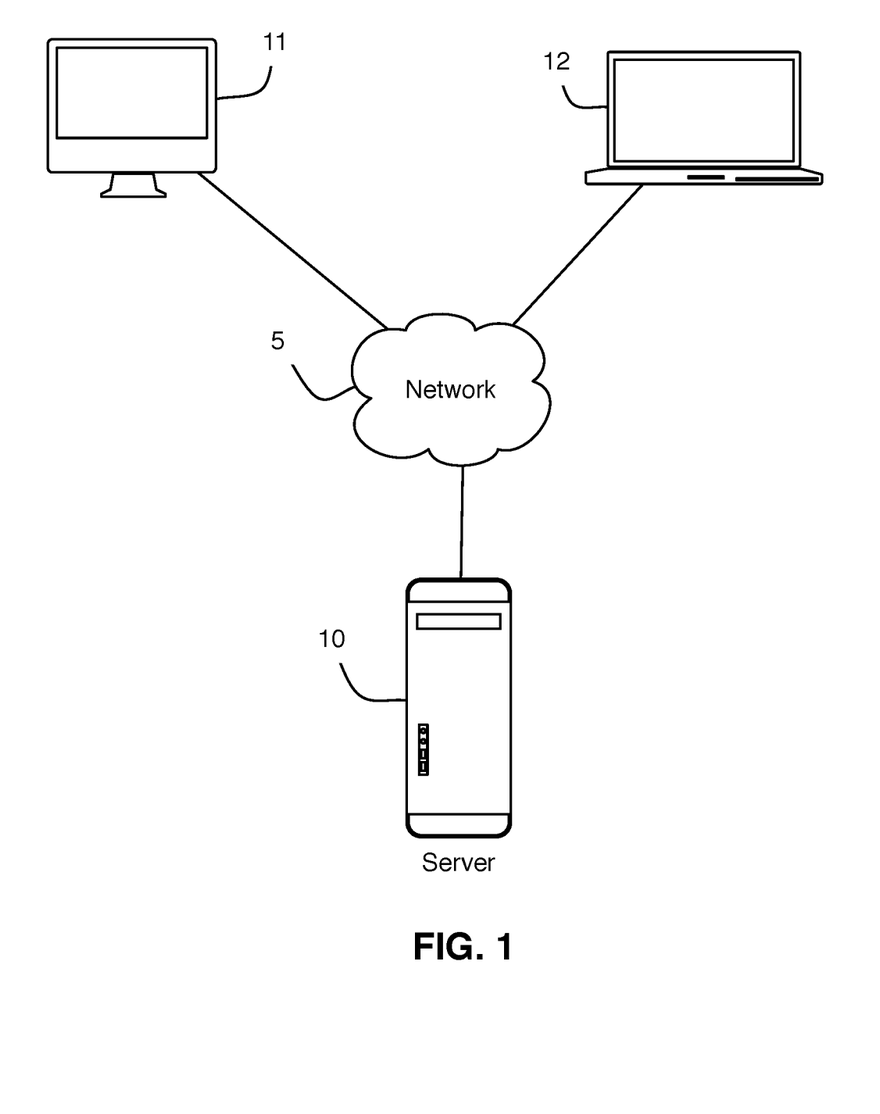
FIG. 1 is a high level representation of an illustrative natural language processing system for resolving partial matches in response to a natural language input from a user.

FIG. 1 is a high level representation of an illustrative NLP system 10 for resolving partial matches in response to a natural language input or query from a user. A user of client computers 11, 12 may submit a natural language input or query to the NLP system 10 over network 5, which may be, for example, an intranet, extranet or the Internet. In this embodiment, the term "user" refers to a person or persons interacting with the NLP system 10 and the term "user input" refers to a query posed by the user. It is understood, however, that other embodiments can be constructed where the term "user" refers to a computer system generating a query, and where the term "user input" refers to a computer-generated query.

It is understood that skilled artisans may implement a further extension to the NLP system 10 shown in FIG. 1, to employ one or more modules for enabling I/O communication between a user or computer system and the NLP system 10 according to (but not limited to) the following user input modalities of text, audio, video, gesture, tactile input and output, etc. Thus, in one embodiment, both a user input or query and a generated query response may be provided in accordance with one or more of multiple modalities including (but not limited to) text, audio, image, video, tactile or gesture.

Figure 2:
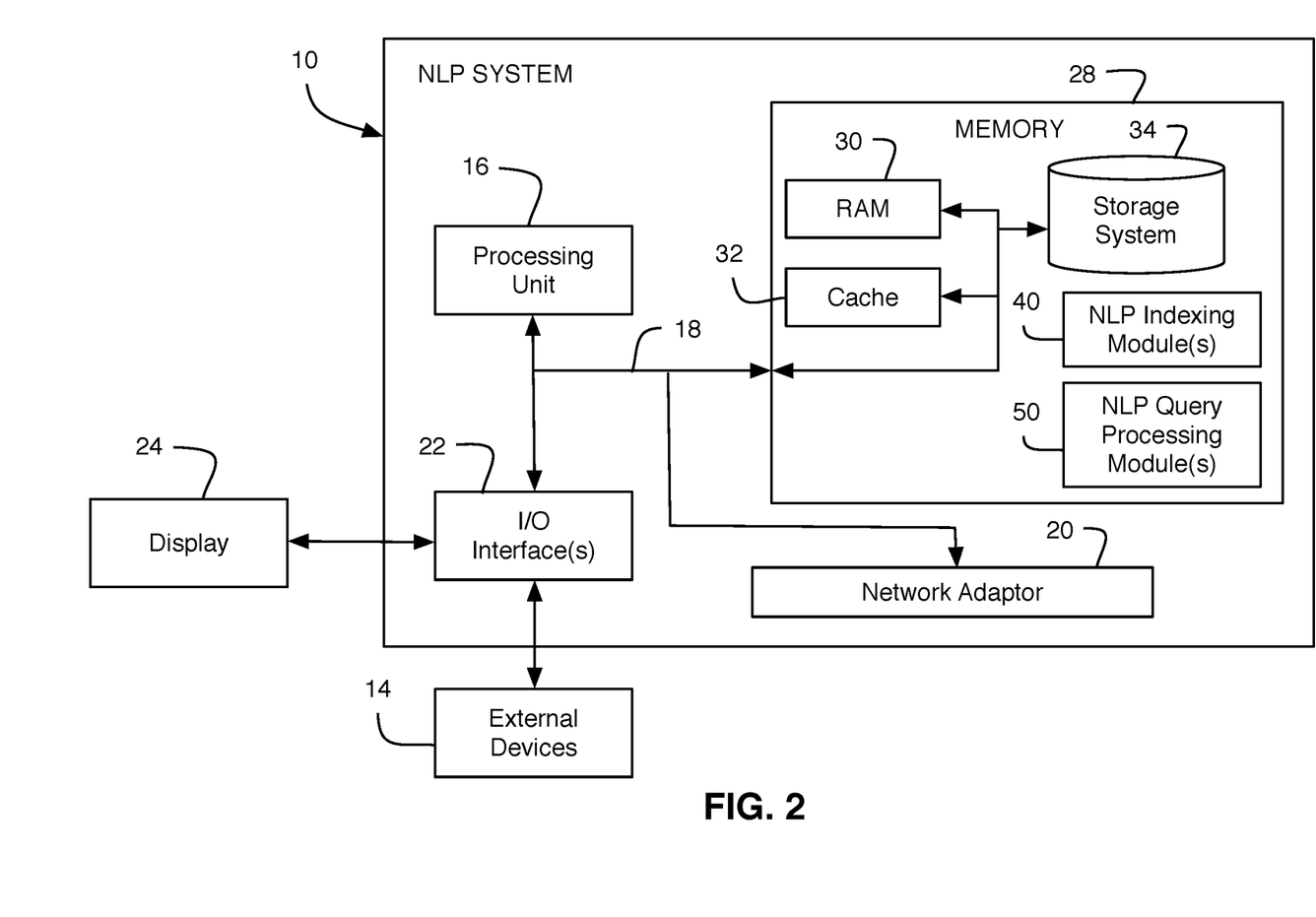
FIG. 2 illustrates a block diagram of a representative computer system configured to implement the natural language processing system of FIG. 1.

Referring to FIG. 2, the NLP system 10 may be operational with numerous other general purpose or special purpose computing systems, environments or configurations. Examples of well-known computing systems, environments and/or configurations that may be suitable for use with NLP system 10 include (but are not limited to) server computer systems, personal computer systems, thin clients, thick clients, hand-held or laptop devices, multiprocessor systems, microprocessor-based systems, mainframe computer systems, and distributed cloud computing environments that include any of the above systems or devices, and the like.

NLP system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 2, NLP system 10 is illustrated in the form of a special purpose computer system. The components of NLP system 10 may include (but are not limited to) one or more processors or processing units 16, a system memory 28, and a bus 18 that couples various system components including memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processor 16 may execute computer programs stored in memory 28. Any suitable programming language can be used to implement the routines of particular embodiments including C, C++, Java, assembly language, etc. Different programming techniques can be employed such as procedural or object oriented. The routines can execute on a single NLP system 10 or multiple NLP systems. Further, multiple processors 16 may be used.

NLP system 10 typically includes a variety of computer system readable media. Such media may be any available media that is accessible by NLP system 10, and it includes both volatile and non-volatile media, removable and non-removable media.

System memory 28 can include computer system readable media in the form of volatile memory, such as random access memory (RAM) 30 and/or cache memory 32. NLP system 10 may further include other removable/non-removable, volatile/non-volatile computer system storage media. By way of example only, storage system 34 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described in this disclosure.

NLP indexing module(s) 40 and NLP query processing module(s) 50 may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

NLP indexing module(s) 40 and NLP query processing module(s) 50 are executable by processor 16 to generally carry out the functions and/or methodologies of embodiments described herein. NLP indexing module(s) 40 and NLP query processing module(s) 50 may be separate software processes, or they may be implemented within the same software process.

NLP system 10 may also communicate with one or more external devices 14 such as a keyboard, a pointing device, a display 24, etc.; one or more devices that enable a user to interact with NLP system 10; and/or any devices (e.g., network card, modem, etc.) that enable NLP module 10 to communicate with one or more other computing devices. Such communication can occur via Input/Output (I/O) interface(s) 22.

In addition, NLP system 10 can communicate with one or more networks such as a local area network (LAN), a general wide area network (WAN) and/or a public network (e.g., the Internet) via network adaptor 20. As depicted, network adaptor 20 communicates with other components of NLP system 10 via bus 18. It should be understood that although not shown, other hardware and/or software components could be used in conjunction with NLP system 10. Examples include (but are not limited to) microcode, device drivers, redundant processing units, external disk drive arrays, RAID systems, tape drives, and data archival storage systems, etc.

Figure 3:
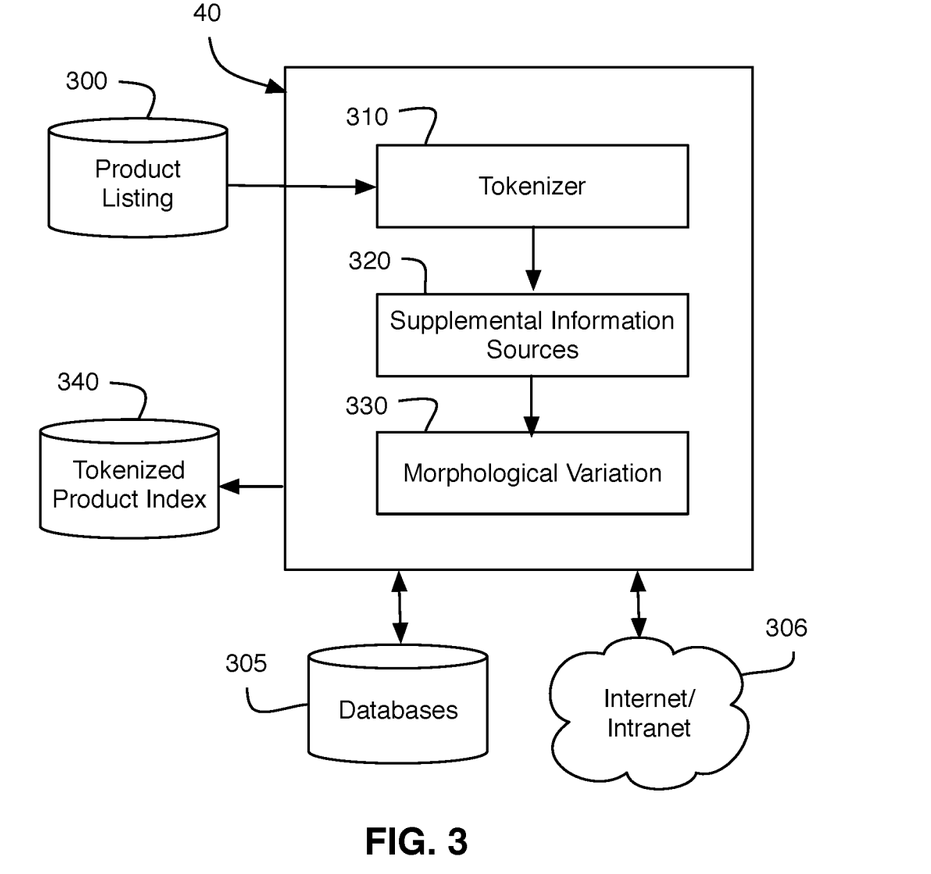
FIG. 3 illustrates a block diagram of natural language processing modules implemented on the illustrative computer system of FIG. 2 for generating a tokenized product or entity index.
Figure 5:
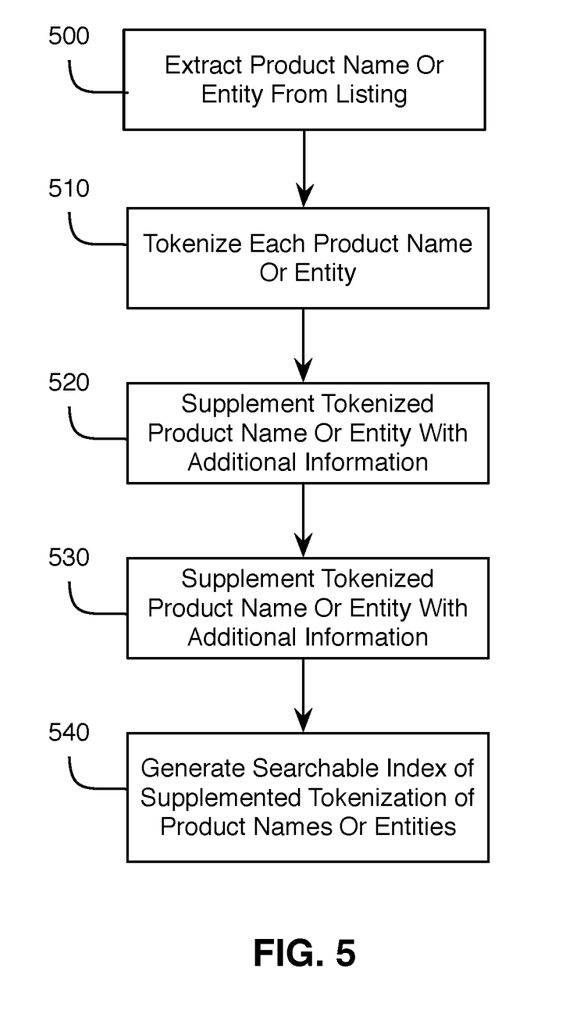
FIG. 5 illustrates a preferred sequence of steps for generating a tokenized product or entity index.

FIGS. 3 and 5 illustrates a block diagram of NLP indexing module(s) 40 executable by processor 16 of the NLP system 10 and an illustrative sequence of steps for generating a tokenized product or entity index 340 based on a product listing or other entity structure 300. For example, the product listing 300 may be a listing of full product names extracted from a catalog (step 500). Alternatively, the listing 300 may be a repository or corpus of documents or other data from which the full product or entity names are extracted. The product listing 300 may be stored in memory 28 of the NLP system 10, or remotely in a database or storage device that is accessible by the NLP system 10.

The NLP indexing module(s) 40 preferably include a tokenizer 310, supplemental information sources 320 and morphological variation module 330. The tokenizer 310 locates word boundaries in the textual string of each product or entity in the product listing 300 and segments the textual string into linguistic units ("tokens"), such as words, punctuation, numbers, alpha-numerics, etc. (step 510). In other words, the tokenizer 300 breaks down the textual string into understandable segments. In the most general sense, a token is an alpha-numeric string that occurs between white space and/or punctuation.

The tokenizer 310 is preferably based on language-modeling principles of high-frequency entities to identify the lowest possible tokenization value. Moreover, in order to find the optimal tokenization pattern, the tokenizer 310 preferably uses a combination of n-gram modeling and TF-IDF tokenization techniques.

For example, if the NLP system 10 is being utilized to parse natural language user input to identify items in a listing 300 (e.g., products in a catalog) and the listing includes the product "Canon EOS 5D Mark iii," then tokenizer 310 would preferably tokenize the product (step 510) as follows:

```
<product>
<category text="canon"/>
<format text="eos"/>
<sub-family text="5d mark iii"/>
<name text="EOS Canon 5d mark iii"/>
</product>
```

In this example, the tokenizer 310 uses language-modeling principles of high-frequency entities to prevent "5D Mark iii" from being tokenized into three separate tokens. This is advantageous since "iii" on its own could not lead the NLP system 10 with high confidence to the conclusion that the user was specifying the product "EOS Canon 5d mark iii." Rather, the tokenizer 310 will determine through language-modeling principles of high frequency entities that "5d mark iii" is the lowest possible tokenization value that could indicate the product specified by the user.

Once the product or entity in the listing 300 has been tokenized by tokenizer 310 (step 510), supplemental information sources 320 may be used to supplement the tokenized product with additional information (step 520), which may be obtained from external structured sources (e.g., product catalog) or from interviews with subject matter experts (SME).

For instance, in the example above, the NLP system 10 may utilize supplemental information sources 320 to transform the tokenized product in the example above as follows:

```
<product>
<formal-name text="cameras"/>
<category text="canon"/>
<brand text="dslr"/>
<format text="eos"/>
<sub-family text="5d mark iii"/>
<name text="EOS Canon 5d mark iii"/>
</product>
```

Supplementing the tokenization with additional information using supplemental information sources 320 (step 520) will allow the NLP system 10 to potentially match a user input of "How many dslr cameras have we sold?" to the "EOS Canon 5D Mark iii" item in the list above.

In addition to supplementing the tokenization (step 520), the morphological variation module 330 supplements the tokenization further with morphological variations derived from an external source (step 530), such as (but not limited to) a lexical database of English (e.g., WordNet™). For instance, the morphological variation module 330 can pluralize nouns by appending an "s" or "es" and multi-phrase nouns may be pluralized via an apostrophe preceding the morphological ending.

In the example above, the morphological variation module 330 supplements the tokenized product (step 530) as follows:

```
<product>
<formal-name text="camera"/>
<formal-name text="cameras"/>
<category text="canon"/>
<category text="canons"/>
<brand text="dslr"/>
<brand text="dslrs"/>
<format text="eos"/>
<sub-family text="5d mark iii"/>
<sub-family text="5d mark iii's"/>
<name text="EOS Canon 5d mark iii"/>
</product>
```

This supplemental tokenization permits the NLP system 10 to process a natural language user input or query, such as "How many canon dslrs have sold?" or "Which regions buy the most 5d mark iii's?"

Once tokenized by tokenizer 310 (step 510) and supplemented by supplemental information sources 320 (step 520) and morphological variation module 330 (step 530), the supplemented tokenization is indexed within the tokenized product index 340 (step 540), which is searchable by the parser 410 of the NLP system 10. The tokenized product index 340 may be stored in memory 28 of the NLP system 10, or remotely in a database or storage device that is accessible by the NLP system 10.

Figure 4:
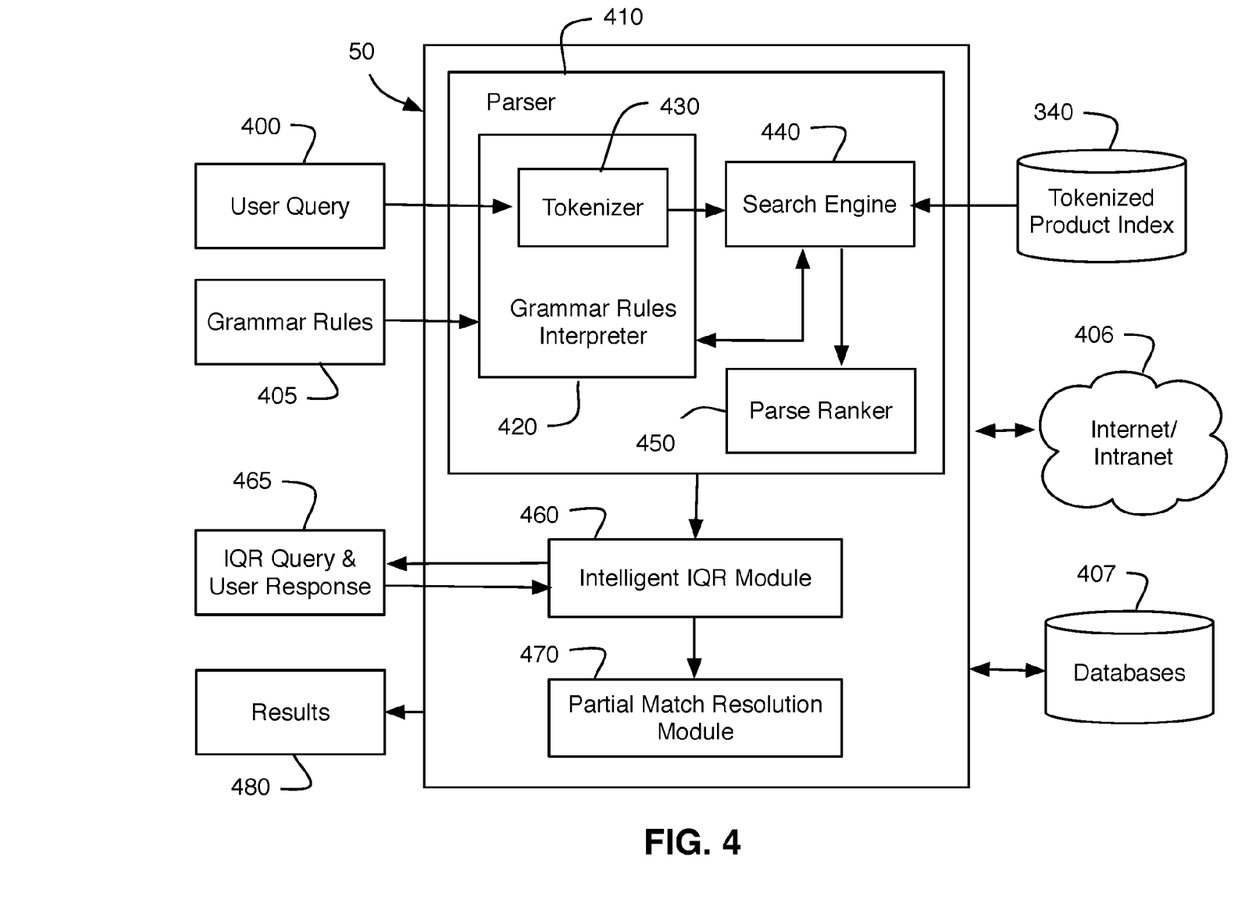
FIG. 4 illustrates a block diagram of natural language query processing modules implemented on the illustrative computer system of FIG. 2 for resolving partial matches in response to a natural language input from a user.
Figure 6:
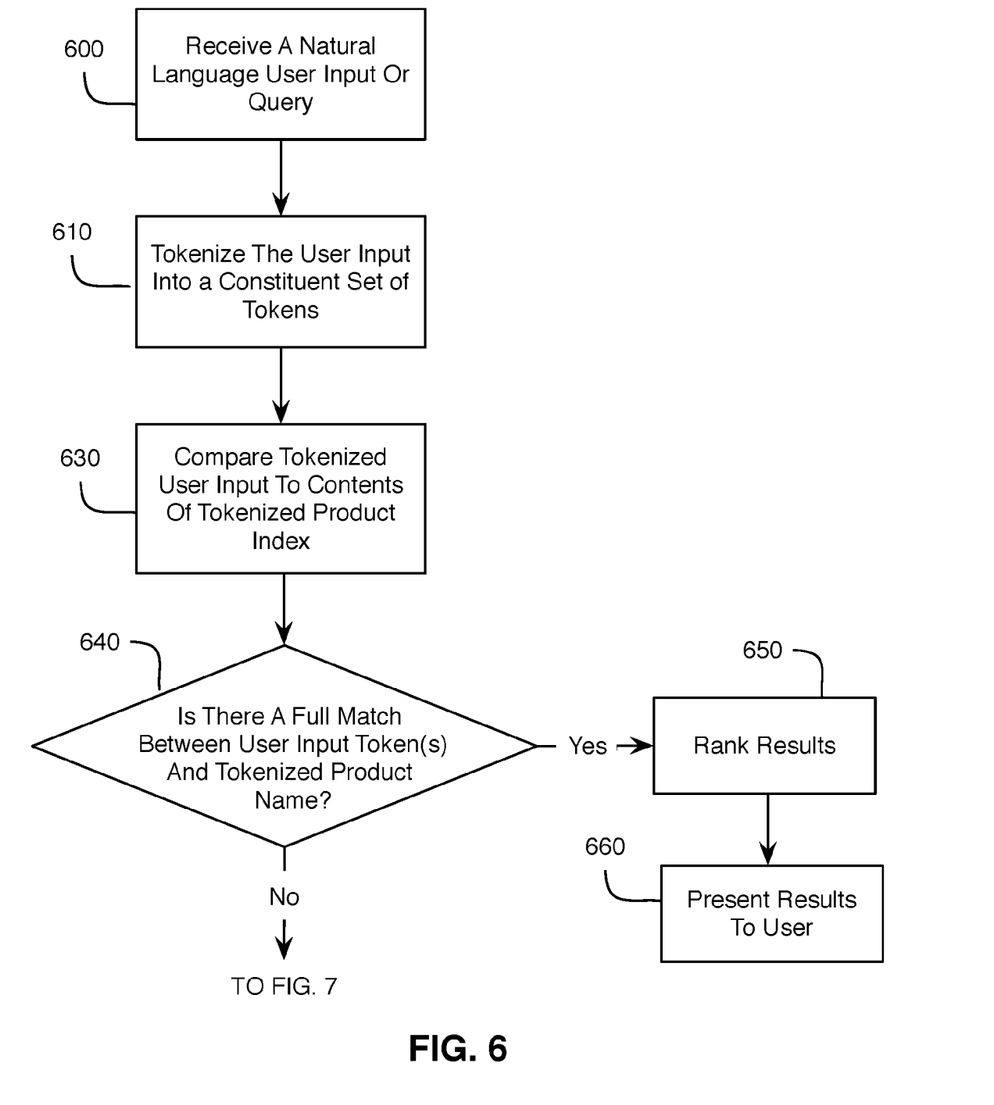
FIG. 6 illustrates a preferred sequence of steps for natural language processing to resolve partial matches in response to a natural language input from a user.
Figure 7:
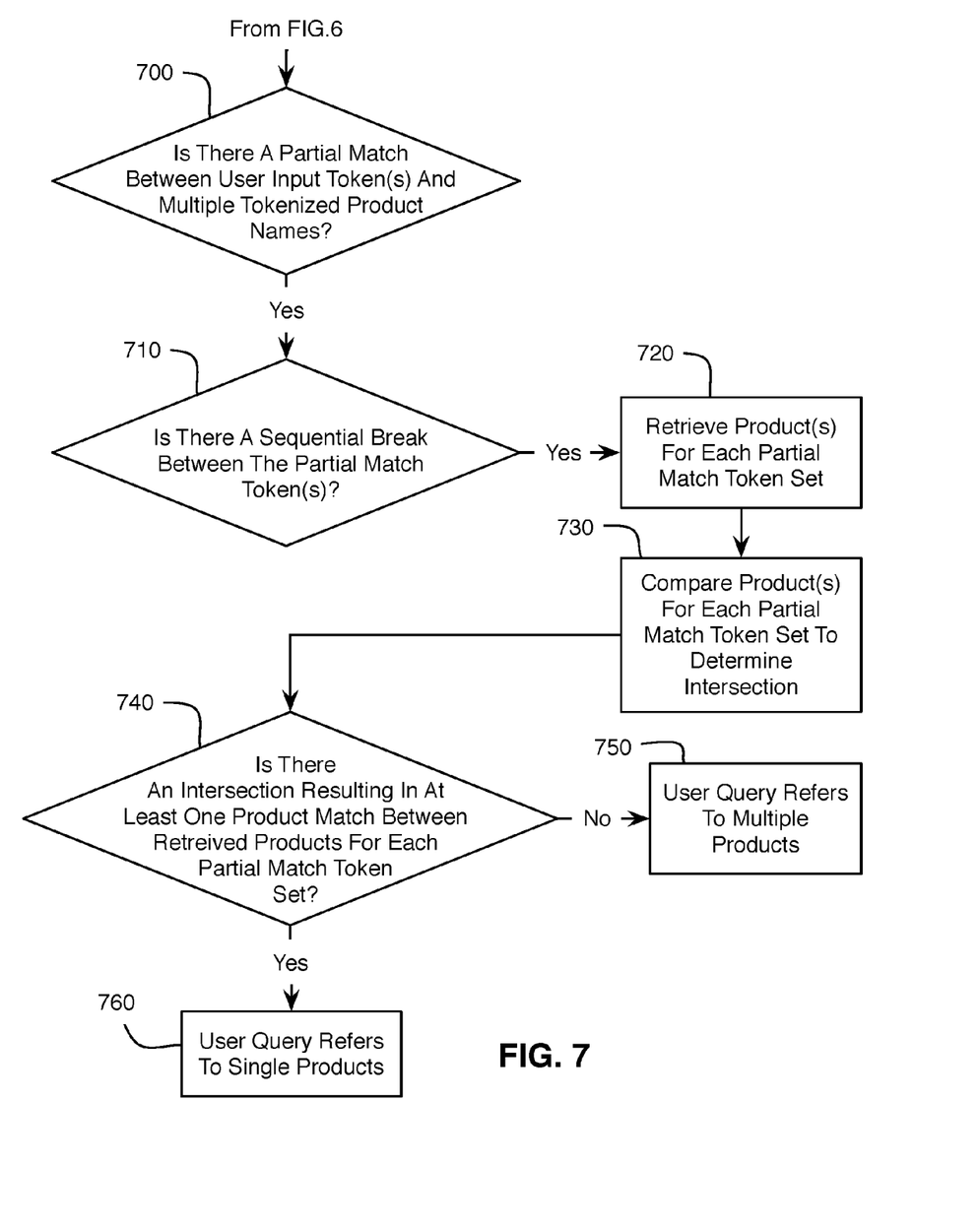
FIG. 7 illustrates a continuing preferred sequence of steps from FIG. 6 for natural language processing to resolve partial matches in response to a natural language input from a user.

FIGS. 4, 6 and 7 illustrate a block diagram of natural language query processing modules 50 executable by processor 16 of the NLP system 10 and a preferred sequence of steps to resolve partial matches in response to a natural language input or query 400 from a user. A natural language user input or query 400 is received by the NLP system 10 for processing (step 600). The user input or query 400 may be in the form of a natural language textual string, which is typically a sentence or phrase.

The natural language query processing modules(s) 50 preferably include a NLP parser 410 with associated grammar rules interpreter 420, tokenizer 430, search engine 440 and parse ranker 450, as well as an intelligent Interactive Query Refinement (IQR) module 460 and a partial match resolution module 470.

The NLP parser 410 receives the natural language user input or query 400 (step 600). The NLP parser 410 preferably includes a grammar rules interpreter 420, which utilizes grammar rules 405 to interpret the user input 400. The grammar rules attempt to codify and interpret actual grammar rules of the natural language, and may be stored in memory 28 of the NLP system 10 or in a remote location accessible to the parser 410.

The NLP parser 410 also includes a tokenizer 430 to tokenize the user input or query 400 (step 610). The tokenizer 430 locates word boundaries in the textual string of the user input or query 400 and segments the textual string into linguistic units ("tokens"), such as words, punctuation, numbers, alpha-numerics, etc. In other words, the tokenizer 430 breaks down the textual string into understandable segments. The tokenizer 430 identifies the words in the user input or query 400, looks them up in a dictionary, makes records for the parts of speech (POS) of the word, and tokenizes each user input or query 400 into a constituent set of tokens, which are passed on to the search engine 440.

The search engine 440 of parser 410, in cooperation with the grammar rules interpreter 420, generates multiple grammatically correct parses of the user input 400. The search engine 440 also performs a look up or comparison of the constituent set of tokens received from the tokenizer 430 for matching tokens in the tokenized product index 340 (step 630). The search engine 440 sends its results to the parse ranker 450, which mathematically measures the likelihood that each parse represents the intended meaning of the user input 400 and ranks each parse from most to least likely.

In many instances, the NLP parser 410 is able to resolve the tokenized user input or query 400 in step 640 to a precise match with a corresponding token(s) in the tokenized product index 340. In that case, the parse ranker 450 ranks the candidate results (step 650) and the NLP system 10 presents the results 480 to the user in response to the user input 400 (step 660).

In the event that the NLP parser 410 is unable to resolve the user input 400 due to ambiguity or in the case of multiple matches, then the intelligent Interactive Query Refinement (IQR) module 350 may optionally cause the NLP system 10 to pose a query 465 back to the user with a possible set of choices. For instance, in the example described above, if the parser 410 received a user input 400 asking "what are the most popular cameras?," the parser 410 might match "cameras" to multiple products in the tokenized product index 340. In that case, the intelligent IQR module 460 may formulate a query 465 based on the user input 400 and cause the NPL system 10 to query the user "Which cameras are you interested in?" along with a list of possible choices. The user may then make a selection from the list of possible choices and transmit that selection back to the intelligent IQR module 460 for use as the product entity.

If the search engine 440 determines that the tokenized user input 400 partially matches multiple items or products indexed in the tokenized product index 340 (partial match tokens) (step 700), the partial match resolution module 470 determines when multiple products are being indicated in the user input 400. The partial match resolution module 470 determines whether the partial match tokens identified from the tokenized user input or query 400 have a sequential break (non-contiguous sequence or matching) (step 710). If so, the non-contiguous sequence of partial match tokens may indicate that the user input or query 400 specifies multiple products. Identification of a non-contiguous sequence of partial match tokens, by itself, cannot guarantee that the user input or query 400 was intended to specify multiple items or products.

In the event that the partial match resolution module 470 identifies non-contiguous partial matches within the tokenized user input or query 400 (step 710)C, the partial match resolution module 470 also pulls back or retrieves from the tokenized product index 340 the products or items for each partial match token set (step 720) and performs an intersection against the products or items for each partial match token set (step 730). If the intersection results in no product matches in step 730, then the partial match resolution module 470 identifies the partial match tokens as disjoint and separate, confirming that the user intended the query 400 to refer to multiple items or products (step 750). On the other hand, if the intersection results in at least one product match in step 730, then the partial match resolution module 470 identifies the partial match tokens as non-disjoint, which is indicative of the user input or query 400 referring to a single product (step 760).

Figure 8:
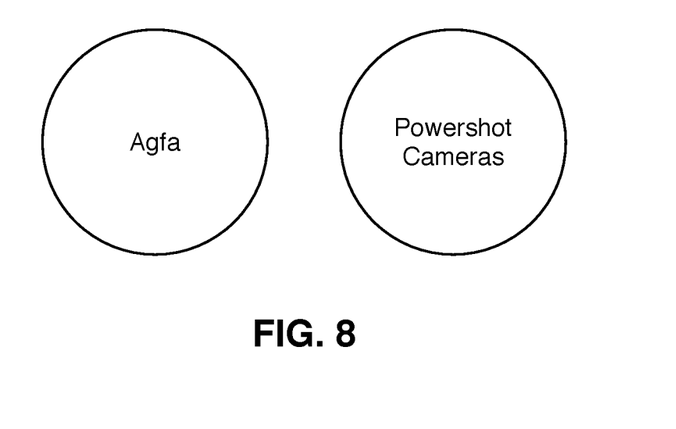
FIG. 8 illustrates a disjoint intersection against non-contiguous partial match tokens indicating that the partial match tokens refer to multiple products.

For example, for the user query 400 "What agfa and powershot cameras from canon sold the best?," the partial match resolution module 470 identifies three partial match tokens with a sequential break (non-contiguous matching) (steps 700, 710). The partial match resolution 470 pulls back or retrieves the products for each token set from the tokenized product index 340 (step 720). "Agfa" would resolve to all product matches that contain the token "agfa" and "powershot, cameras" would resolve to all product matches that contain the tokens "powershot" and "cameras." The partial match resolution module 470 would then perform an intersection against the product matches for "agfa" and "powershot, cameras" (step 730), which is illustrated in FIG. 8. Because the token sets "agfa" and "powershot, cameras" are disjoint and separate, resulting in no intersection between the respective token sets (step 740), the partial match resolution module 470 determines that the user intended for the query 400 to refer to multiple products (step 750).

Figure 9:
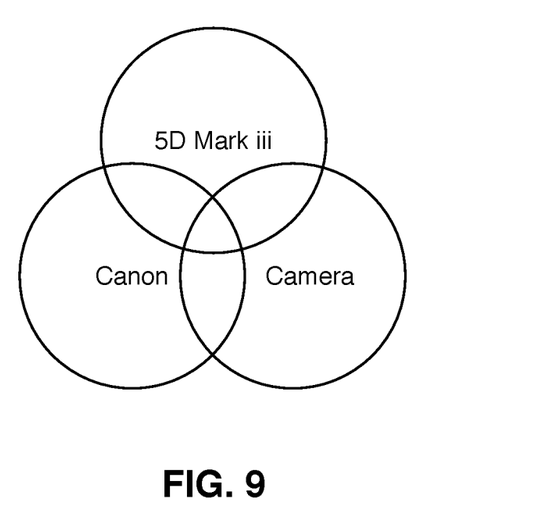
FIG. 9 illustrates a non-disjoint intersection against non-contiguous partial match tokens indicating that the partial match tokens refer to a single product.

In another example, for the user query "What 5d mark iii model camera from Canon sold the best?," the partial match resolution module 470 identifies three non-contiguous partial match tokens (steps 700, 710). The partial match resolution module 470 pulls back the products for each token set from the tokenized product index 340 (step 720). "5D Mark iii" would resolve to all product matches that contain the token "5D Mark iii"; "camera" would resolve to all product matches that contain the token "camera"; and "Canon" would resolve to all product matches that contain the token "Canon." The partial match resolution module 470 would then perform an intersection against the product matches for "5D Mark iii," "camera" and "Canon" (step 730), which is illustrated in FIG. 9. Because the token sets "5D Mark iii," "camera" and "Canon" are non-disjoint, resulting in a common intersection containing at least one product match (step 740), the partial match resolution 470 determines that the user intended for the query 400 to refer to a single product (step 760).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the appended claims.

What is claimed is:

1. A computer implemented natural language processing method for resolving partial matches, comprising:
    receiving, using a computer processor, a natural language input query that does not fully specify an entity;
    tokenizing, using the computer processor, the input query into a constituent set of query tokens;
    searching, using the computer processor, an entity index by comparing the query tokens to contents of the index, the contents representing a plurality of entities, each of which is tokenized into a constituent set of entity tokens associated with the tokenized entity;
    identifying, using the computer processor, a plurality of partial match query tokens from the set of query tokens, each partial match query token matching at least one entity token in the index;
    determining, using the computer processor, whether a sequential break exists in the input query between the partial match query tokens;
    for each partial match query token, determining, using the computer processor, the entity corresponding to each partial match query token by identifying the entity associated with each entity token in the index that matches the partial match query token;
    determining, using the computer processor, whether there is an intersection between the identified entities corresponding to the partial match query tokens; and
    when a sequential break exists in the input query between the partial match query tokens and there is no intersection between the identified entities corresponding to the partial match query tokens
        determining, using the computer processor, that the input query relates to a plurality of entities, and
        presenting a response to the received natural language input query to a user based upon the identified entities.

2. The computer-implemented method according to claim 1, further comprising:
    when there is an intersection between the identified entities corresponding to the partial match query tokens resolving and reducing the identified entities into a single entity, and
    presenting a response to the received natural language input query to the user based upon the single entity.

3. The computer-implemented method according to claim 1, wherein the constituent set of entity tokens associated with the tokenized entity in the index are derived by the processor using a combination of language modeling principles of high-frequency products, n-gram modeling and TF-IDF tokenization techniques.

4. The computer-implemented method according to claim 1, wherein the constituent set of entity tokens associated with the tokenized entity in the index includes information obtained from an external source.

5. The computer-implemented method according to claim 1, wherein the constituent set of entity tokens associated with the tokenized entity in the index includes morphological variations of the tokenized entity.

6. The computer-implemented method according to claim 1, wherein each entity in the entity index is a product name.

7. The computer-implemented method according to claim 1, further comprising:
    generating, using the computer processor, a query response to a user that initiated the input query, the query response requesting information from the user about the input query;
    transmitting, using the computer processor, the query response to the user; and
    receiving information from the user in response to the query response.

8. The computer-implemented method according to claim 7, wherein the query response includes a set of choices that the user may select from to respond to the query response.

9. A natural language processing system for resolving partial matches, comprising:
    a computer processor;
    an index stored in computer memory and searchable by the computer processor, the index having contents representing a plurality of entities, each entity having been tokenized into a constituent set of entity tokens associated with the tokenized entity; and
    computer memory, the computer memory storing a series of program instructions, wherein the program instructions are executable by the computer processor to:
        receive a natural language input query that does not fully specify an entity;
        tokenize the input query into a constituent set of query tokens;
        search the index by comparing the query tokens to the entity tokens in the index;
        identify a plurality of partial match query tokens from the set of query tokens, each partial match query token matching at least one entity token in the index;
        determine whether a sequential break exists in the input query between the partial match query tokens;
        for each partial match query token, determine the entity corresponding to each partial match query token by identifying the entity associated with each entity token in the index that matches the partial match query token;

determine whether there is an intersection between the identified entities corresponding to the partial match query tokens; and when a sequential break exists in the input query between the partial match query tokens and there is no intersection between the identified entities corresponding to the partial match query tokens
determine that the input query relates to a plurality of entities, and
generate and provide a response to the received natural language input query to a user based upon the identified entities.

10. The natural language processing system according to claim 9, wherein the program instructions, when executed, further cause the computer processor to:
when there is an intersection between the identified entities corresponding to the partial match query tokens
resolve and reduce the identified entities into a single entity, and
generate and provide a response to the received natural language input query to the user based upon the single entity.

11. The natural language processing system according to claim 9, wherein the constituent set of entity tokens associated with the tokenized entity in the index are derived by the processor using a combination of language modeling principles of high-frequency entities, n-gram modeling and TF-IDF tokenization techniques.

12. The natural language processing system according to claim 9, wherein the constituent set of entity tokens associated with the tokenized entity in the index includes information obtained from an external source.

13. The natural language processing system according to claim 9, wherein the constituent set of entity tokens associated with the tokenized entity in the index includes morphological variations of the tokenized entity.

14. The natural language processing system according to claim 9, wherein each entity in the index is a product name.

15. The natural language processing system according to claim 9, wherein the program instructions, when executed, further cause the computer processor to:
generate a query response to a user that initiated the input query, the query response requesting information from the user about the input query;
transmit the query response to the user; and
receive information from the user in response to the query response.

16. The natural language processing system according to claim 15, wherein the query response includes a set of choices that the user may select from to respond to the query response.

17. A computer implemented natural language processing method for resolving partial matches when a natural language input query does not fully specify an entity, comprising:
tokenizing, using a computer processor, the input query into a constituent set of query tokens;
comparing the query tokens to contents of an index searchable by the processor, the contents representing a plurality of entities, each of which is tokenized into a constituent set of entity tokens associated with the tokenized entity;
identifying, using the computer processor, a plurality of partial match query tokens from the set of query tokens, each partial match query token matching at least one entity token in the index;
determining, using the computer processor, whether there is a sequential break in the input query between the partial match query tokens;
for each partial match query token, identifying, using the computer processor, the entity associated with each entity token in the index that matches the partial match query token;
determining, using the computer processor, whether there is an intersection between the identified entities corresponding to the partial match query tokens; and
when a sequential break exists in the input query between the partial match query tokens and there is no intersection between the identified entities corresponding to the partial match query tokens
determining, using the computer processor, that the input query relates to a plurality of entities, and
generate and provide a response to the received natural language input query to a user based upon the identified entities.

18. The computer-implemented method according to claim 17, further comprising:
when there is an intersection between the identified entities corresponding to the partial match query tokens
resolving and reducing the identified entities into a single entity, and
generate and provide a response to the received natural language input query to the user based upon the single entity.

19. The computer-implemented method according to claim 17, further comprising:
generating, using the computer processor, a query response to the input query, the query response requesting information about the input query;
transmitting, using the computer processor, the query response to the user; and
receiving information from the user in response to the query response.

20. The computer-implemented method according to claim 19, wherein the query response includes a set of choices that the user may select from to respond to the query response.

\* \* \* \* \*